Dec. 13, 1938.  H. E. TAUTZ  2,140,146
BROACH
Filed Nov. 7, 1936
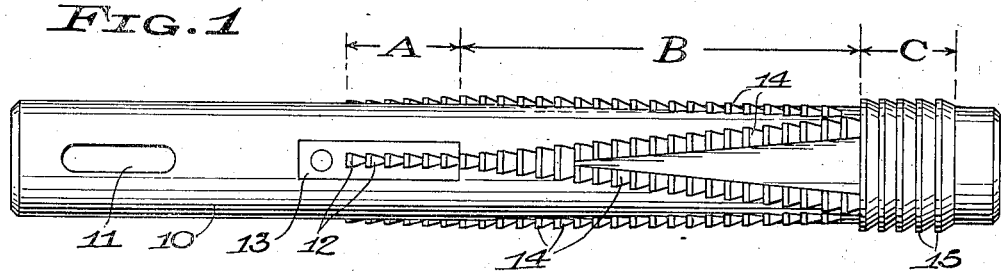
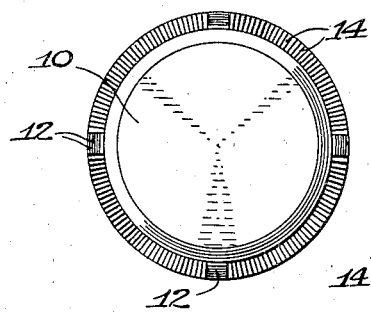
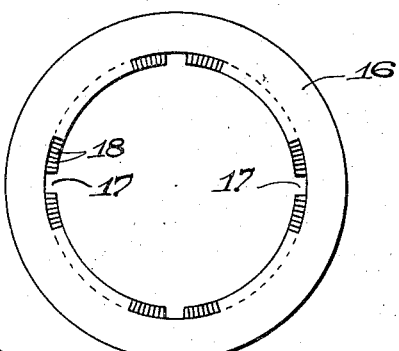
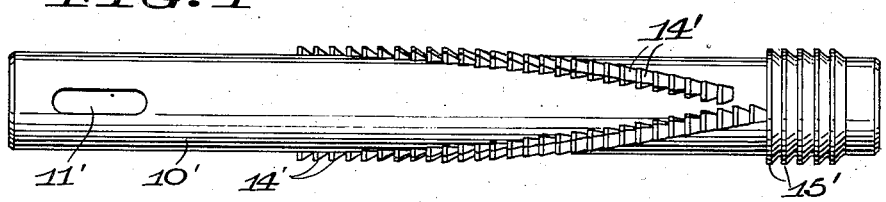
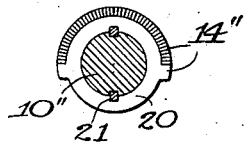
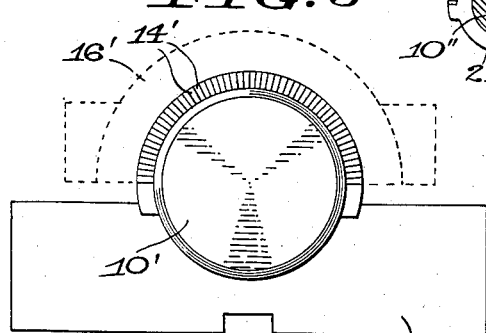
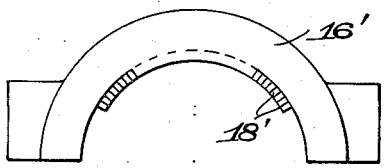
INVENTOR
Herbert E. Tautz
By
ATTORNEY
WITNESSES

Patented Dec. 13, 1938

2,140,146

UNITED STATES PATENT OFFICE 2,140,146

BROACH

Herbert E. Tautz, Milwaukee, Wis.

Application November 7, 1936, Serial No. 109,699

6 Claims. (Cl. 29—95.1)

The invention relates to cutting tools, and more particularly to broaches.

In the broaching of bores in articles of cast-iron and other materials, it has been customary to use a broach with cutting teeth of progressively larger radius. A casting of ordinary cast-iron has a hard abrasive skin or shell which is found to be destructive to the cutting edges of the usual type of broach, resulting in a comparatively short life for the broach.

It is an object of the present invention to provide an improved broach suitable for cutting work-pieces of cast-iron and other metals, and of such construction as to insure long service.

Another object of the invention is to provide a broach having cutting teeth arranged in such manner as to permit rapid and economical cutting.

The invention further consists in the several features hereinafter described and claimed.

In the accompanying drawing, illustrating certain embodiments of the invention,

Fig. 1 is a longitudinal view of a broach constructed in accordance with the invention;

Fig. 2 is a front end view of the broach;

Fig. 3 is an end view of a tubular work-piece which has been partially cut by the broach, the remaining portion to be cut being indicated by dotted lines;

Fig. 4 is a longitudinal view of a modified form of broach;

Fig. 5 is a front end view of the broach of Fig. 4 mounted in a holder, the position of the work being indicated in dotted lines;

Fig. 6 is an end view of a bearing cap which has been partially cut by the broach of Figs. 4 and 5, the remaining portion to be cut being indicated by dotted lines;

Fig. 7 is a longitudinal view of another modified form of broach, parts being broken away; and, Fig. 8 is a transverse sectional view of the broach of Fig. 7.

In that form of the invention shown in Figs. 1 to 3, 10 designates a cylindrical broach body having the usual aperture 11 near its front end for the attachment of a pulling device, not shown.

The first cutting section, A, of the broach is tapered and consists of one or more rows of narrow steep-sided cutting teeth 12, the rows extending longitudinally of the broach body, and the teeth in each row being of progressively increasing radius or length. The teeth 12 are preferably arranged in one or more pairs of diametrically opposite rows parallel to the axis of the broach, two pairs of rows being indicated in the present instance, and each pair of adjacent rows being 90° apart. Preferably, the teeth 12 in each row are carried on a base plate 13 detachably secured in the broach body, so as to facilitate renewal of these teeth.

The second cutting section, B, of the broach consists of one or more rows of steep-sided cutting teeth 14 secured integrally or otherwise to the broach body, the teeth being all of the same height or length and the rows extending longitudinally of the broach body. Preferably, each row of teeth is helically arranged and two rearwardly diverging rows of teeth 14 continue behind each row of grooving teeth 12, so that the two adjacent rows of teeth 14 continuing behind two adjacent rows of grooving teeth 12 will converge rearwardly. One or more of the rear teeth 14 in one row of each pair of converging rows extend rearwardly of the teeth in the other row, so as to complete the cut. The outer cutting edges of the teeth 14 lie in a common cylindrical surface concentric with the broach. In the present instance, each row of cutting teeth extends approximately 45° around the broach body. The outer cutting edges of adjacent teeth overlap laterally, or in a peripheral direction, so as to cut a smooth continuous cylindrical surface. The side cutting edge of each tooth extends steeply from the outer cutting edge, and is here shown approximately at right angles to the outer cutting edge, thus minimizing the exposure of the side cutting edge to the hard skin or case of the work.

The final cutting section, C, of the broach consists of one or more finishing teeth 15 of any suitable form secured to the broach body, each tooth being slightly larger in radius than the preceding tooth. The finishing teeth are here indicated to be of annular form. In some instances, the finishing teeth may be omitted.

The broach above described is adapted for enlarging and finishing a cylindrical opening in a work-piece 16, here exemplified by a tubular cast-iron member. A casting of this metal has a hard abrasive skin or case which is found to be destructive to the cutting edges of ordinary broaches. With the broach of the present invention, this skin is penetrated locally by the narrow grooving teeth 12 as the broach is forced through the work-piece, and the wear cause by the skin is confined to these relatively few teeth, which can be readily replaced when necessary. The action of the teeth 12 is to cut narrow longitudinal grooves 17 in the work-piece, as seen in Fig. 3, only a relatively small effort being required. As the broach advances, the teeth 14 enter the grooves 17 and cut strips or slices 18 at the opposite sides of each groove, the width of the slices extending substantially radially, and all the teeth 14 cutting to the same depth or radius. The strips or slices 18 extend parallel to the axis of the bore. As each slice 18 is cut it breaks away laterally from the cutting tooth 14, slightly in advance of the tooth, so that the hard abrasive skin at the edge of the slice does not touch the cutting edge, and the exposed edge of the skin at the as yet uncut portion of the work bears only lightly, if at all, on the side cutting edge of the tooth. The result is that the cutting teeth 14 will have a relatively long life. The helically arranged teeth 14 cut successive full-depth slices from the work, until a circular bore is produced. The rearwardly converging relation of the rows of teeth serves to resist relative rotation of the work and broach by the side thrust of the teeth. In the further advance of the broach, the finishing teeth 15 pass through the bore cut by the teeth 14 to thereby produce a smooth accurate finish.

In some instances, the broach may be turned relative to the work as the broach advances through the work, in which event the progressive lateral cutting can be effected without requiring a helical and convergent positioning of the rows of cutting teeth.

The modified form of broach shown in Figs. 4 and 5 is adapted for broaching a semi-cylindrical recess in a work-piece such as the bearing cap 16' shown in Fig. 6. This broach has a cylindrical body 10' provided with the aperture 11' near its front end. As the bearing cap does not require a preliminary longitudinal grooving to penetrate the hard abrasive skin, the grooving teeth 12 of the broach of Fig. 1 are not required. A pair of helically arranged rearwardly converging rows of cutting teeth 14' are secured integrally or otherwise on the broach body 10' and are similar to the teeth 14 of the Fig. 1 device. The outer cutting edges of the teeth 14' all have the same height, and lie in a common cylindrical surface concentric with the broach body. One or more of the teeth 14' in one row extend rearwardly of the teeth in the other row to complete the cut. Each helically arranged row of teeth is shown to extend substantially 90° about the broach body. The broach is also shown to have a final cutting section consisting of one or more finishing teeth 15' similar to the teeth 15 of the Fig. 1 device. The broach body 10' is preferably mounted on a slidable holder 19, Fig. 5, by which it moved past the work-piece 16', the latter being suitably clamped in position.

In operation, as the broach of Figs. 4 and 5 advances, the teeth 14' cut successive slices 18' from the work-piece, all the teeth cutting to the same depth or radius. The cutting starts at the opposite sides of the semi-cylindrical recess in the work-piece and continues to the middle of this recess. In the further advance of the broach, the finishing teeth 15' produce a smooth accurate semi-cylindrical surface. As in the device of Fig. 1, the helically arranged rows of cutting teeth 14' will have a relatively long life, notwithstanding the presence of the hard abrasive skin on the casting.

In the modified form of broach shown in Figs. 7 and 8, the helically arranged rows of cutting teeth 14" are formed on a series of annular plates 20 which are detachably mounted on a broach body 10" and are secured thereon against relative rotation by keys 21. By this construction renewal of the cutting edges is readily effected, either by dressing the cutting edges after removing the plates, or by substituting other plates. This broach is adapted for the same service as the broach of Figs. 4 and 5. If desired, the broach of Figs. 1 and 2 may have its teeth formed on separate plates in the manner of the broach of Figs. 7 and 8.

While the several broaches above described are used for cutting cylindrical surfaces of circular or semi-circular cross-section, it will be obvious that the invention is also applicable to the cutting of other cylindrical surfaces, such as elliptical and semi-elliptical surfaces.

What I claim as new and desire to secure by Letters Patent is:

1. A broach for cutting an extended cylindrical surface, comprising a broach body having a helically arranged row of steep-sided cutting teeth, the outer cutting edges of which lie in a common cylindrical surface, the side cutting edge of each tooth being approximately at right angles to the outer cutting edges.

2. A broach for cutting an extended cylindrical surface, comprising a broach body having a helically arranged row of steep-sided cutting teeth having outer cutting edges and side cutting edges, the outer cutting edges of which lie in a common cylindrical surface, the outer cutting edges of the adjacent teeth in said row overlapping laterally.

3. A broach having a row of steep-sided cutting teeth extending longitudinally of the broach and having outer cutting edges and side cutting edges, the outer cutting edges of said teeth lying in a common cylindrical surface for cutting successive laterally adjacent strips from a work-piece to form a cylindrical surface on the work-piece.

4. A broach for articles of cast-iron or the like, having steep-sided grooving teeth of progressively increasing length to cut a groove in the article and to thereby penetrate the hard abrasive skin on the article, said broach having serially arranged steep-sided cutting teeth of uniform length following the grooving teeth and having outer cutting edges and side cutting edges to produce successive cuts laterally enlarging the groove to an extended cylindrical surface to thereby minimize injury to the cutting edges of said cutting teeth by said hard abrasive skin.

5. A broach having steep-sided grooving teeth of progressively increasing length to cut a preliminary groove in the work and having a row of steep-sided cutting teeth of equal height following the grooving teeth, said cutting teeth having side cutting edges and having outer cutting edges lying in a common cylindrical surface to laterally enlarge the groove to an extended cylindrical surface, said row of cutting teeth being helically arranged.

6. A broach for cutting a semi-cylindrical recess in a work-piece, comprising a broach body having a pair of rearwardly converging helically arranged rows of steep-sided cutting teeth thereon, the outer edges of said teeth lying in a cylindrical surface, and the foremost cutting teeth in said rows being substantially diametrically opposite.

HERBERT E. TAUTZ.

CERTIFICATE OF CORRECTION.

Patent No. 2,140,146. December 13, 1938.

HERBERT E. TAUTZ.

It is hereby certified that error appears in the printed specification of the above numbered patent requiring correction as follows: Page 2, second column, line 27, claim 1, for the word "edges" read edge; and that the said Letters Patent should be read with this correction therein that the same may conform to the record of the case in the Patent Office.

Signed and sealed this 31st day of January, A. D. 1939.

Henry Van Arsdale (Seal) Acting Commissioner of Patents.